Oct. 22, 1929.    B. E. LENEHAN    1,732,726
METHOD OF AND APPARATUS FOR MEASURING VOLT AMPERES
Filed June 10, 1927
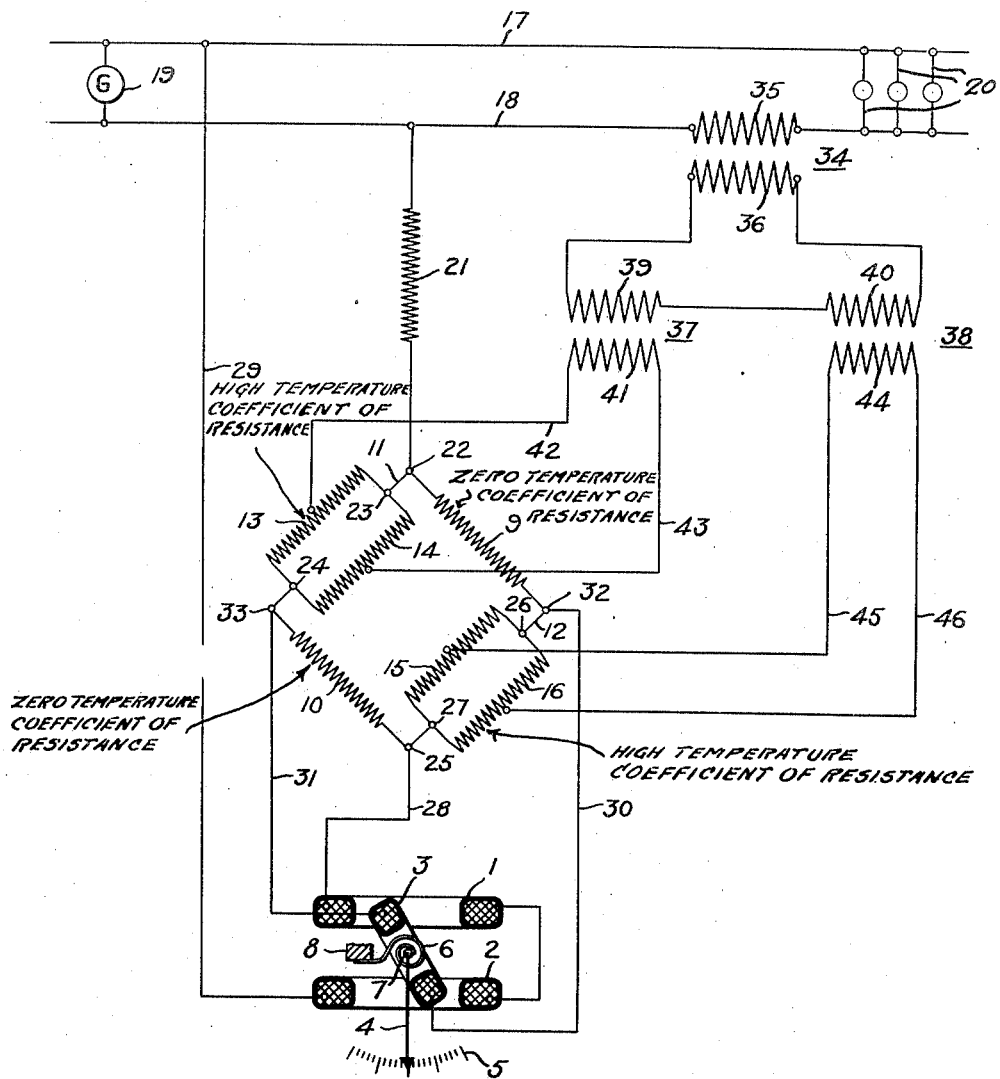
WITNESSES:
INVENTOR
Bernard E. Lenehan,
BY
ATTORNEY Patented Oct. 22, 1929

1,732,726

UNITED STATES PATENT OFFICE

BERNARD E. LENEHAN, OF WILKINSBURG, PENNSYLVANIA, ASSIGNOR TO WESTINGHOUSE ELECTRIC & MANUFACTURING COMPANY, A CORPORATION OF PENNSYLVANIA

METHOD OF AND APPARATUS FOR MEASURING VOLT AMPERES

Application filed June 10, 1927. Serial No. 197,861.

My invention relates to electrical measuring instruments for indicating the product of dissimilar electrical quantities of an electrical circuit.

My invention resides in a method of, and apparatus for, controlling the passage of current along a main path, including a current-responsive device and along an auxiliary path including a second current-responsive device, in such manner that the first current-responsive device cooperates with the second current-responsive device to produce an indication of the product of two quantities such as the current and voltage of an electrical circuit; and it is characteristic of my apparatus for this purpose that it is relatively inexpensive and compact and that it may omit features of ordinary measuring apparatus heretofore known to the art.

It is further characteristic of my invention that coacting flux-producing members indicating the product of volts and amperes are substantially unaffected by the difference in phase angle between the voltage and current.

My invention resides in apparatus for energizing one of a plurality of coacting members by a current varying in accordance with the potential of an electrical circuit and for energizing another of said members by another current varying in accordance with the current of said electrical circuit, said last-named current being in phase with said first named current, regardless of the phase difference between the current and voltage of said electrical circuit.

My invention resides in the method and apparatus of the character hereinafter described and claimed, the foregoing and further characteristics of my invention being determinable from the following description.

For an understanding of my method and the description of a form my apparatus may take, reference is to be had to the accompanying drawing, in which;

The single figure is a diagrammatic view of that form of my invention employing two coils or windings and their relation to a Wheatstone bridge and an electrical circuit.

Referring to the drawing, 1 and 2 are cylindrical or rectangular coils, and 3 is a coil relatively movable with respect to coils 1 and 2. The coil 3 is provided with a pointer 4, the relative position of which may be indicated by scale 5. The movement of the coil 3 and the pointer 4 may be restrained by any suitable means, such as a spring 6 secured to a shaft 7 of the coil 3 and a stationary portion 8 forming a part of the frame of the meter (not shown).

The coils of the instrument are connected to a number of interconnected resistances, as in the form of a Wheatstone bridge. The resistances comprise a portion 9 having a substantially zero temperature coefficient of resistance and a portion 10 of a similar construction as portion 9 disposed oppositely thereto. The other portions of the Wheatstone bridge comprise a current path 11 and a current path 12 severally comprising resistors 13 and 14 and 15 and 16. The resistances of the paths 11 and 12 are substantially equal to the resistances of the resistors 9 and 10, at normal ambient temperature. The resistors 13 and 14 and the resistors 15 and 16 are, however, preferable of a resistance having a relatively high temperature coefficient as compared with that of the resistors 9 and 10.

The stationary coils 1 and 2 are energized from the mains 17 and 18 of an electrical circuit, conducting, for example, alternating current from a generator 19 to a load 20. The current traversing the stationary coils 1 and 2 is limited to a desirable quantity by any suitable means, as, for example, a resistor 21 in series-circuit relation therewith. The current energizing the stationary coils 1 and 2 traverses the resistor 21 and divides equally, at normal ambient temperature, at the junction 22, one-half flowing through resistor 9 and one-half flowing through path 11. The current flowing through path 11 divides at the junction 23, one half traversing the resistor 13 and one half traversing the resistor 14. These currents unite again at junction 24 and traverse the resistor 10 to the junction 25. That part of the current traversing the resistor 9 divides, in a similar manner, at junction 26 and one half traverses the resistor 15 and one half the resistor 16, both halves uniting at junction 27 and both original halves uniting at junction 25 and traversing the conductor 28 through the stationary coils 1 and 2 back to the main 17 through conductor 29.

The movable coil 3 is placed in series-circuit relation, by conductors 30 and 31, with the junctions 32 and 33, respectively, of the Wheatstone bridge. Any unbalance in the Wheatstone bridge or, rather, any difference in potential between the junction 32 and 33 causes a current to traverse the movable winding 3 in accordance with such difference of potential. The current traversing the winding 3 is, therefore, a portion of the current traversing the windings 1 and 2, because, upon a difference of potential between the junctions 32 and 33, current flowing through the bridge by virtue of the difference of the potential between the mains 17 and 18 flows from one to the other of the junctions 32 and 33, through conductor 30, winding 3 and conductor 31.

The difference of potential between the junction 32 and junction 33 may be produced, in accordance with the current traversing the load 20, in any suitable manner, for example, by heating the resistors 13 and 14 and resistors 15 and 16 in accordance with the current traversing the load 20. To this end, current derived from the secondary winding of a main current transformer 34, having a primary winding 35 and a secondary winding 36, energizes current transformers 37 and 38 having, respectively, primary windings 39 and 40 in series-circuit relation with the secondary winding 36 of the transformer 34. The primary winding 39 of the current transformer 37 energizes a secondary winding 41 which sends a current through a conductor 42 and a conductor 43 to mid-points of the resistors 13 and 14, respectively. In a similar manner, the primary 40 of the current transformer 38 energizes a secondary 44 that sends a current through conductors 45 and 46 to the mid-points of resistors 15 and 16, respectively. The paths 11 and 12 of the Wheatstone bridge are heated in accordance with the current traversing the load 20 and, since these portions are constructed of a material having a high temperature coefficient of resistance, the resistance of the paths 11 and 12 increases substantially in accordance with the square of the increase in current which may take place in the load 20.

The current traversing the stationary windings 1 and 2 is proportional to the difference of the potential between the mains 17 and 18. The currents traversing the movable winding 3 is also proportional to the difference in potential between the mains 17 and 18 because, as hereinbefore mentioned, the current traversing the winding 3 is a portion of the current traversing the windings 1 and 2 caused by any unbalance between the junctions 32 and 33 of the Wheatstone bridge. Since the unbalance in the Wheatstone bridge is proportional to the heating or the square of the change in current, and the current in the stationary coils 1 and 2 is proportional to the voltage, the torque produced between the moving coil 3 and the stationary coils 1 and 2 is proportional to the product of the square of the voltage between mains 17 and 18 and to the square of the current traversing the load 20. Accordingly, scale 5 may be calibrated to indicate volt-amperes.

While I have shown a preferred embodiment of my invention in the connections and diagrams hereinbefore particularly described, it will be apparent to those skilled in the art that it may be modified without departing from the spirit and scope of the appended claims.

I claim as my invention:

1. The method of measuring the volt-amperes traversing an alternating-current circuit which comprises heating portions of a Wheatstone bridge in accordance with the current traversing the electrical circuit, energizing a coil from the electrical circuit and energizing another coil in accordance with the unbalance in said Wheatstone bridge, said first named coil coacting with said second named coil to perform an indicating function.

2. An electrical measuring instrument for measuring volt-amperes comprising coacting flux producing members, means for energizing one of said members in accordance with the voltage of an electrical circuit, means, comprising a Wheatstone bridge, for energizing another of said members in accordance with the current of said electrical circuit, and means for unbalancing said Wheatstone bridge in accordance with said current.

3. An electrical measuring instrument for measuring volt-amperes comprising coacting flux-producing members, means for energizing one of said members in accordance with the voltage of an electrical circuit and means for energizing another of said members from the voltage of said electrical circuit in accordance with the current of said electrical circuit.

4. An electrical instrument comprising coacting flux-producing members, means for energizing one of said members in accordance with the voltage of an electrical circuit, means, including a Wheatstone bridge, for energizing another of said members in accordance with the current of said electrical circuit, and means for heating portions of said Wheatstone bridge in accordance with said current, whereby said Wheatstone bridge is unbalanced.

5. An electrical measuring instrument comprising movable and stationary coacting coils, means for producing a torque in said movable coil substantially proportional to the volt-amperes of an electrical circuit, said means including a Wheatstone bridge in series-circuit relation with said stationary coils, said circuit being in parallel-circuit relation with said electrical circuit, said Wheatstone bridge consisting of alternate resistors having substantially zero and high temperature coefficients of resistance respectively, means for heating the resistors having high temperature coefficients of resistance and means for energizing the movable coil in accordance with the unbalance between predetermined junctions of said Wheatstone bridge caused by said heating.

6. In combination, an alternating current circuit, a Wheatstone bridge in parallel-circuit relation with said circuit, means for heating opposite portions of said bridge in accordance with the current of said circuit, and a measuring instrument having relatively-movable coacting flux-producing coils connected respectively one in series-circuit relation with said bridge and one in parallel-circuit relation with the unbalanced terminals of said bridge.

7. In combination, a main path including a current responsive device, a Wheatstone bridge in said main path, an auxiliary path across said bridge including a second current responsive device, means for passing a current derived from a voltage source through said main path, and means for controlling the magnitude of the current traversing said auxiliary path, including means for heating opposite portions of said bridge in accordance with the current of said source.

8. In combination, a main path including a Wheatstone bridge and an element of a measuring instrument in series-circuit relation, an auxiliary path across the corners of said bridge including an element of said measuring instrument, means for passing a current derived from the same voltage source along both of said paths, and means for heating opposite portions only of said bridge in accordance with the current of said source.

9. A measuring device for alternating current circuits comprising a Wheatstone bridge, a measuring instrument having coacting flux producing coils, one of said coils being connected so as to be energized in accordance with the unbalance of said bridge, means for unbalancing said bridge in accordance with the current of an alternating current circuit, and means for energizing the other of said coils and said Wheatstone bridge by the voltage of said alternating current circuit.

10. In combination, a source of electrical power, a consumer of electrical power, a circuit conducting current from said source to said consumer, and means for measuring the volt-amperes of said circuit, including a Wheatstone bridge, and a measuring instrument having coacting members, means connecting said bridge and one of said members in circuit relation, means connecting another one of said members across said bridge, and means for heating opposite portions of said bridge in accordance with the current of said conducting circuit.

11. In combination, an alternating-current transmission circuit, a Wheatstone bridge in parallel with said circuit, means for unbalancing said bridge in accordance with the current of said circuit, and means for measuring the product of the unbalance of said bridge by the voltage of said circuit.

In testimony whereof, I have hereunto subscribed my name this 2nd day of June, 1927.

BERNARD E. LENEHAN.